United States Patent [19]
Wolfe et al.

[11] Patent Number: 6,039,882
[45] Date of Patent: *Mar. 21, 2000

[54] REMEDIATION OF ENVIRONMENTAL CONTAMINANTS USING A METAL AND A SULFUR-CONTAINING COMPOUND

[75] Inventors: N. Lee Wolfe; Mark G. Cipollone, both of Athens, Ga.

[73] Assignees: The United States of America as represented by the United States Environmental Protection Agency, Washington, D.C.; Dyncorp, Inc., Reston, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 08/739,842

[22] Filed: Oct. 30, 1996

Related U.S. Application Data

[60] Provisional application No. 60/007,124, Oct. 31, 1995.

[51] Int. Cl.$^7$ .................................................. C02F 1/70
[52] U.S. Cl. ..................... 210/747; 210/757; 210/908; 405/128
[58] Field of Search .................. 210/719, 747, 210/757, 908; 405/128

[56] References Cited

U.S. PATENT DOCUMENTS

| | | |
|---|---|---|
| 3,640,821 | 2/1972 | Sweeney et al. . |
| 3,737,384 | 6/1973 | Sweeney et al. . |
| 4,194,973 | 3/1980 | Smith . |
| 4,382,865 | 5/1983 | Sweeny . |
| 5,093,011 | 3/1992 | Friedman et al. ....................... 210/757 |
| 5,266,213 | 11/1993 | Gillham . |
| 5,362,394 | 11/1994 | Blowes et al. ........................... 210/747 |
| 5,362,404 | 11/1994 | Haitko et al. ............................ 210/757 |
| 5,447,639 | 9/1995 | Sivavec .................................... 210/757 |
| 5,480,579 | 1/1996 | Seech et al. . |
| 5,575,927 | 11/1996 | Sivavec et al. .......................... 210/757 |
| 5,578,210 | 11/1996 | Klecka ..................................... 210/747 |
| 5,618,427 | 4/1997 | Seech et al. . |

OTHER PUBLICATIONS

Biernat, R. J. et al., "High–Temperature Potential/pH Diagrams for the Iron–Water and Iron–Water–Sulphur Systems", *Electro. Acta*, vol. 17, pp. 1261–1283, Peramon Press (1972).

Gillham, Robert W. et al., "Enhanced Degradation of Halogenated Aliphatics by Zero–Valent Iron", *Ground Water*, vol., 32, No. 6, pp. 959–967, Nov.–Dec. 1994.

Gillham, Robert W. et al., "Metal–Catalysed Abiotic Degradation of Halogenated Organic Compounds", IAH Conference, pp. 1–10, May 1992.

Kriegman–King, Michelle R. et al., "Transformation of Carbon Tetrachloride by Pyrite in Aqueous Solution", *Environ. Sci. Tech.*, vol. 28, No. 4, pp. 692–700, 1994.

"Aqueous Oxidation of Pyrite by Molecular Oxygen", *Chemical Review*, vol. 82, No. 5, Oct. 1982.

Matheson, Leah J. et al., "Reduction Dehalogenation of Chlorinated Methanes by Iron Metal", *Environ. Sci. Technol.*, vol. 28, No. 12, pp. 2045–2053, 1994.

(List continued on next page.)

*Primary Examiner*—David A. Simmons
*Assistant Examiner*—Betsey J. Morrison
*Attorney, Agent, or Firm*—Jones & Askew, LLP

[57] ABSTRACT

A method and composition for the remediation of environmental contaminants in soil, sediment, aquifer material, water, or containers in which contaminants were contained, wherein contaminants are reacted with a remediating composition comprising a metal and a sulfur-containing compound to produce environmentally-acceptable, chemically reduced products. The method is useful for treating contaminants such as halogenated hydrocarbons, pesticides, chemical warfare agents and dyes. The remediating composition preferably contains comminuted, commercial grade iron and iron sulfide. The addition of an alcohol to the reactants enhances the rate of the remediation reaction, particularly for contaminants of soils and sediments.

9 Claims, 8 Drawing Sheets

OTHER PUBLICATIONS

O'Hannesin, Stephanie F. et al., "A Permeable Reaction Wall for in Situ Degradation of Halogenated Organic Compounds", Papers Presented 45th Canadian Goetechnical Society Conference, Oct. 1992.

*The Environmental Process,* "Metal–Enhanced Abiotic Degradation of Chlorinated Organic Compounds", pp. 1–4.

Robinson, Robert et al. "Chemistry, Biology and Toxicology as Related to Environmental Problems" *Chemosphere*, vol. 29, No. 8, Nov. 1994.

Senzaki, T. et al., "Removal of Organochloro Compounds in Wastewater by Reductive Treatment: Reductive Degradation of 1,1,2,2–Tetrachloroethane with Iron Powder", *Nat. Aeron. and Space Adm.*, NASA TT–21250, pp. 1–17, Dec. 1992.

Senzaki, T et al., "Removal of Organic Chlorine Chemical Compounds by USe of Some Reduction Processes (The 2nd Report)—Processing Trichloroethylene with Iron Powder", *Nat. Aeron. and Space Adm.*, NASA TT–21249, pp. 1–20, Dec. 1992.

"Environmental Successes in the Chemical Industry", *205th ACS National Meeting*, Preprints of Papers vol. 33, No. 1, Mar.–Apr. 1993.

Gillham, Robert W., "Resurgence in Research Concerning Organic Transformations Enhanced by Zero–Valent Metals and Potential Application in Remediation of Contaminated Groudwater", *205th ACS National Meeting*, Preprints of Papers, vol. 35, No. 1, pp. 691–698, Apr. 1995.

Johnson, Timothy L. et al., "Dechlorination of Carbon Tetrachloride by Iron Metal: The Role of Competing Corrosion Reactions", *205th ACS National Meeting*, Preprints of Papers, vol. 35, No. 1, pp. 699–701, Apr. 1995.

Weber, Eric J., "Iron–Mediated Reductive Transformations: Investigations of Reaction Mechanism", *205th ACS National Meeting*, Preprints of Papers, vol. 35, No. 1, pp. 702–706, Apr. 1995.

Totten, Lisa A., "Investigating Electron Transfer Pathways during Reductive Dehalogenation Reactions Promoted by Zero–Valent Metals", *205th ACS National Meeting*, Preprints of Papers, vol. 35, No. 1, pp. 706–710, Apr. 1995.

Festa, Kara D. et al., "Kinetics and Free Energy Change During the Reductive Dehalogenation of Carbon Tetrachloride by Elemental Iron", *205th ACS National Meeting*, Preprints of Papers, vol. 35, No. 1, pp. 711–715, Apr. 1995.

Klausen, J.W. et al., "Reduction of Substituted Nitrobenzenes by FE(II) in Aqeuous Suspensions of Mineral Oxides",*205th ACS National Meeting*, Preprints of Papers, vol. 35, No. 1, pp. 716–719, Apr. 1995.

Agrawal, Abinash et al., "Processes Affecting Nitro Reduction by Iron Metal: Mineralogical Consequences of Precipitation in Aqueous Carbonate Environment", *205th ACS National Meeting*, Preprints of Papers, vol. 35, No. 1, pp. 720–723, Apr. 1995.

Hardy Leslie I. et al., "Formation of Hydrocargons from the Reduction of Aqueous $CO_2$ by Zero–Valent Iron", *205th ACS National Meeting*, Preprints of Papers, vol. 35, No. 1, pp. 724–727, Apr. 1995.

Liang L. et al., "ORNL/MMES Research into Remedial Applications of Zero–Valence Metals: 1: Laboratory Analysis of Reductive Dechlorination of Trichlorethene", *205th ACS National Meeting*, Preprints of Papers, vol. 35, No. 1, pp. 728–731, Apr. 1995.

Helland, B.R. et al., "Oxygen Controlled Product Formation in CCl4 Dechlorination Using Zero–Valent Iron", *205th ACS National Meeting*, Preprints of Papers, vol. 35, No. 1, pp. 732–734, Apr. 1995.

Hassan, Sayed M. et al., "Reaction Mechanisms Involved in the Reduction of Halogenated Hydrocarbons with Sulfated Iron", *205th ACS National Meeting*, Preprints of Papers, vol. 35, No. 1, pp. 735–738, Apr. 1995.

Ravary, C. et al., "Abiotic Aspects of Zero–Valent Induced Degradation of Aqueous Pentachlorophenol", *205th ACS National Meeting*, Preprints of Papers, vol. 35, No. 1, pp. 738–729, Apr. 1995.

Focht, Robert M. et al., "Dechlorination of 1,2,3–Trichloropropane by Zero–Valent Iron", *205th ACS National Meeting*, Preprints of Papers, vol. 35, No. 1, pp. 741–744, Apr. 1995.

Slanter, Darsa P. et al., "Transformation of the Pesticide 1,2–Dibromo–3–Chloropropane (DBCP) and Nitrate by Iron Powder and by $H_2Pd/Al_2O_3$", *205th ACS National Meeting*, Preprints of Papers, vol. 35, No. 1, pp. 745–748, Apr. 1995.

Schreier, Cindy G. et al., "Catalytic Dehydrohalogenation and Hydrogenation using H2 and Suppported Palladium as a Method for the Removal of Tetrachlorethylene from Water", *205th ACS National Meeting*, Preprints of Papers, vol. 35, No. 1, pp. 749–751, Apr. 1995.

Korte, Nic et al., "ORNL/MMES Research into Remedial Applications of of Zero–Valence Metals 2: Bimetallic Enhancements", *205th ACS National Meeting*, Preprints of Papers, vol. 35, No. 1, pp. 752–754, Apr. 1995.

Clausen, Jay L. et al., "ORNL/MMES Research into Remedial Applications of Zero–Valence Metals: 3) Removal of TCE, CTS–1,2–DCE, Vinyl Chloride, and Technetium", *205th ACS National Meeting*, Preprints of Papers, vol. 35, No. 1, pp. 755–758, Apr. 1995.

Boronina, Tatyana et al., "Destruction of Organohalides in Water Using Metal Particles, Carbon Tetrachloride/Water Reactions with Magnesium, Tin and Zinc", *205th ACS National Meeting*, Preprints of Papers, vol. 35, No. 1, pp. 759–762, Apr. 1995.

Tundo, Pietro et al., "Hydrodehalogenation of Polyhalogenated Aromatics under Multiphase Conditions", *205th ACS National Meeting*, Preprints of Papers, vol. 35, No. 1, pp. 763–766, Apr. 1995.

Pulgarin, C. et al., "Abiotic Degradation of Atrazine on Zero–Valent Iron Activated by Visible Light", *205th ACS National Meeting*, Preprints of Papers, vol. 35, No. 1, pp. 767–770, Apr. 1995.

Chuang, Fei–Wen et al., "Zero–Valent Iron–Promoted Dechlorination of Polychlorinated Biphenyls (PCBs)", *205th ACS National Meeting*, Preprints of Papers, vol. 35, No. 1, pp. 771–774, Apr. 1995.

Campbell, Timothy J. et al., "Sorption of PCE in a Reactive Zero–Valent Iron System", *205th ACS National Meeting*, Preprints of Papers, vol. 35, No. 1, pp. 775–777, Apr. 1995.

Holser, R.A. et al., "Mass Transfer Effects on the Dehalogenation of Trichloroethene by Iron/Pyrite Mixtures", *205th ACS National Meeting*, Preprints of Papers, vol. 35, No. 1, pp. 778–779, Apr. 1995.

Blowes, D.W. et al., "In–Situ Remediation of Chromium Contaminated Groundwater Using Zero–Valent Iron", *205th ACS National Meeting*, Preprints of Papers, vol. 35, No. 1, pp. 780–783, Apr. 1995.

Powell, Robert M. et al., "Corrosive and Gbochemical Mechanisms Influencing in Situ Chromate Reduction by Metallic Iron", *205th ACS National Meeting*, Preprints of Papers, vol. 35, No. 1, pp. 784–787, Apr. 1995.

Puls, Robert W. et al., "In Situ Remediation of Ground Water Contaminated with Chromate and Chlorinated Solvents Using Zero–Valent Iron: A Field Study", *205th ACS National Meeting*, Preprints of Papers, vol. 35, No. 1, pp. 788–791, Apr. 1995.

Yamane, C.L. et al., "Installation of a Subsurface Groundwater Treatment Wall Composed of Granular Zero–Valent Iron", *205th ACS National Meeting*, Preprints of Papers, vol. 35, No. 1, pp. 792–795, Apr. 1995.

Mackenzle, Patricia D. et al., "Pilot–Scale Demonstration of Reductive Dechlorination of Chlorinated Ethenes by Iron Metal", *205th ACS National Meeting*, Preprints of Papers, vol. 35, No. 1, pp. 796–799, Apr. 1995.

Vogan, J.L. et al., "Site Specific Degradtion of Vocs in Groundwater Using Zero Valent Iron", *205th ACS National Meeting*, Preprints of Papers, vol. 35, No. 1, pp. 800–805, Apr. 1995.

Scherer, Michelle M. et al., "Dechlorination of Carbon Tetrachloride by Iron Metal: Effect of Reactant Concentrations", *205th ACS National Meeting*, Preprints of Papers, vol. 35, No. 1, pp. 805–806, Apr. 1995.

Haitko, Deborah A. et al., "Enhanced Trichlorethylene Dechlorination by Fe(0)", *205th ACS National Meeting*, Preprints of Papers, vol. 35, No. 1, pp. 807–808, Apr. 1995.

Assaf–Anid, Nada et al., "Reductive Dechlorination of Carbon Tetrachloride and Hexachlorobenzene by Zero–Valent Metals", *205th ACS National Meeting*, Preprints of Papers, vol. 35, No. 1, pp. 809–811, Apr. 1995.

Cipollone, Mark G. et al., "Kinetic Studies on the Use of Metallic Iron to Reduce Organic Compounds in Water Under Environment Conditions", *205th ACS National Meeting*, Preprints of Papers, vol. 35, No. 1, pp. 812–814, Apr. 1995.

Orth, W. Scott et al., "Chloride and Carbon Mass Balance for Iron–Enhanced Degradation of Trichlorethene", *205th ACS National Meeting*, Preprints of Papers, vol. 35, No. 1, pp. 815–817, Apr. 1995.

Eykholt, Gerald R. et al., "Conservative Flow Tracers for Iron Column Studies", *205th ACS National Meeting*, Preprints of Papers, vol. 35, No. 1, pp. 818–821, Apr. 1995.

Milburn, R. et al., "Iron (Fe) Induced Dehalogenation of Polychlorinated Aliphatic Compounds", *205th ACS National Meeting*, Preprints of Papers, vol. 35, No. 1, pp. 822–824, Apr. 1995.

Harms, S. et al., "Degradation of Carbon Tetrachloride in the Presence of Iron and Sulphur Containing Compounds", *205th ACS National Meeting*, Preprints of Papers, vol. 35, No. 1, pp. 825–828, Apr. 1995.

Weathers, L.J. et al., "Methanogens Couple Anaerobic Fe(0) Oxidation and $CHCl_3$ Reduction", *205th ACS National Meeting*, Preprints of Papers, vol. 35, No. 1, pp. 829–832, Apr. 1995.

Schreier, Cindy G. et al., "Transformation of Chlorinated Ethylenes by Iron Powder in 4–(2–Hydroxyethyl)–1–Piperazineethanesulfoinc Acid (HEPES) Buffer", *205th ACS National Meeting*, Preprints of Papers, vol. 35, No. 1, pp. 833–835, Apr. 1995.

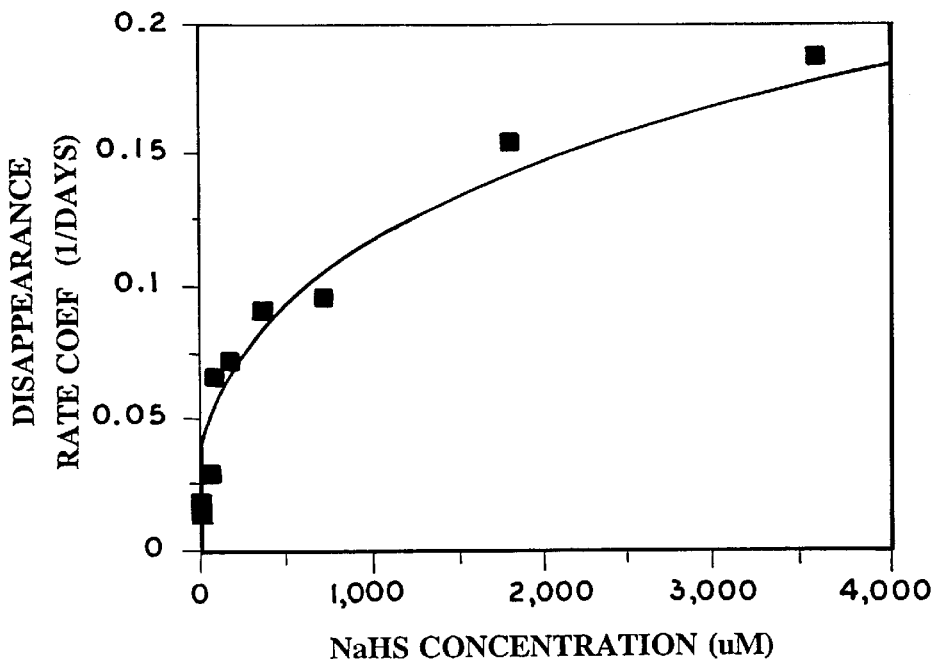
Fig_1
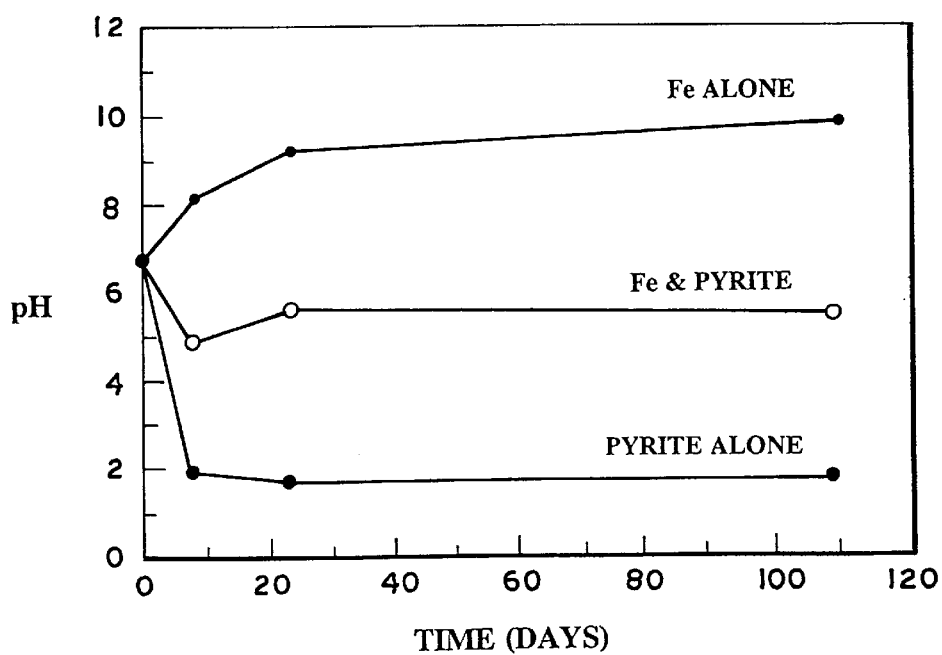
Fig_2

RETENTION TIME (MIN)

Fig_4

Fig_5

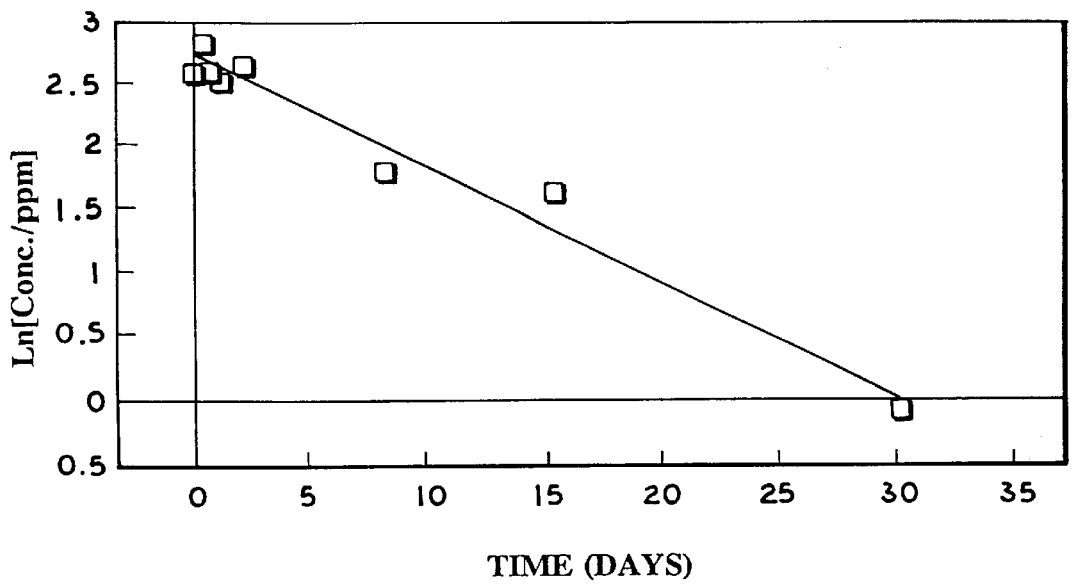
Fig_10
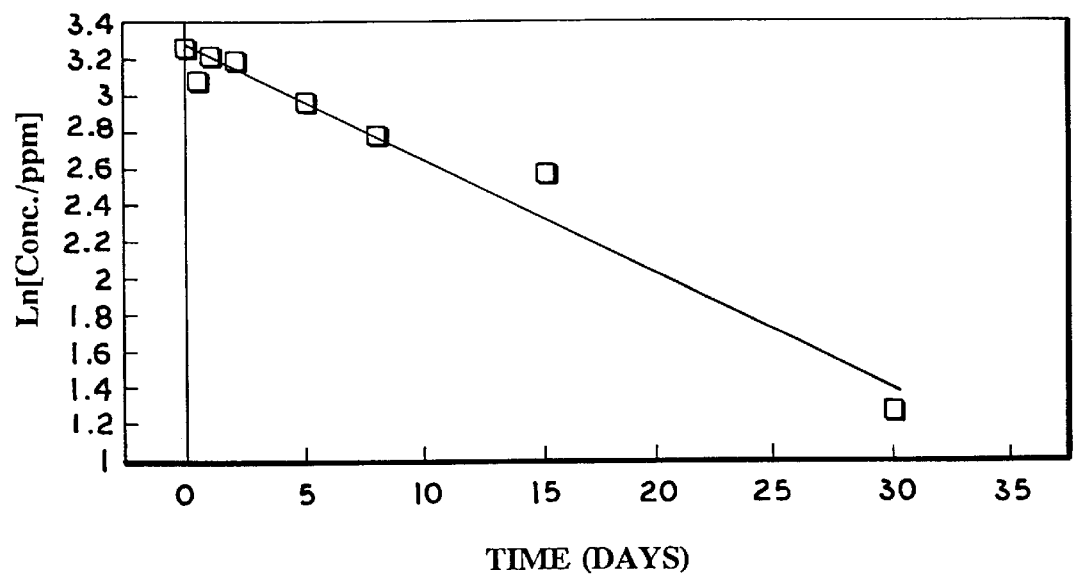
Fig_11

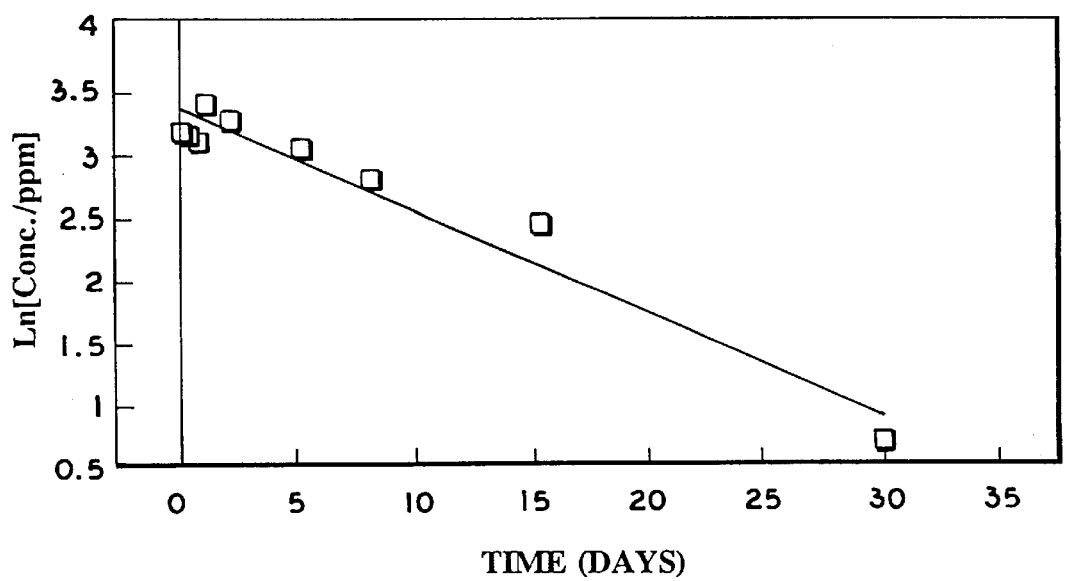
Fig_12
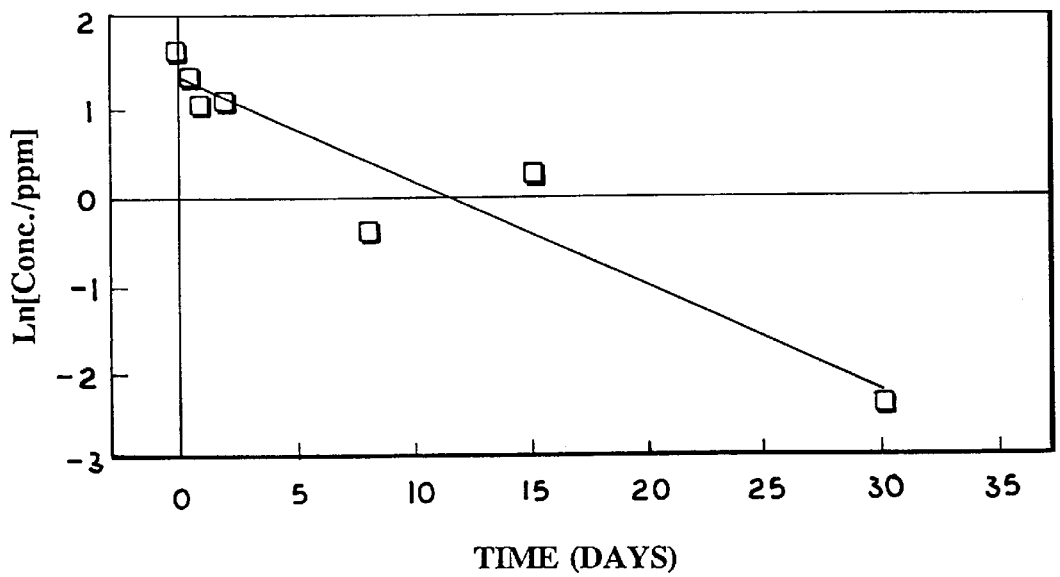
Fig_13

REMEDIATION OF ENVIRONMENTAL CONTAMINANTS USING A METAL AND A SULFUR-CONTAINING COMPOUND

CROSS REFERENCE TO RELATED APPLICATION

This application claims priority to U.S. Provisional Application No. 60/007,124, filed Oct. 31, 1995.

BACKGROUND OF THE INVENTION

The present invention relates to the field of chemistry and ecology and more particularly to the remediation of environmental contaminants.

Contamination of the air, water and soil is a severe problem endangering the lives of many plants and animals, including humans. Many attempts have been made to reduce contamination by either preventing escape of the contaminants into the environment, containing the contaminants at one site, or treating the contaminants in some way to make them less harmful.

Halogenated Hydrocarbons

Halogenated hydrocarbons as a class of compounds are one of the most ubiquitous pollutants in the United States. Halogenated hydrocarbons have been and still are widely used in many industries as cleaning solvents, refrigerants, fumigants and starting materials for the syntheses of other chemicals. Because of the extensive use and stability of halogenated hydrocarbons, there are hundreds of contaminated groundwater and landfill sites in the United States, many of which are superfund sites for which there is no inexpensive, effective remediation technology available. Also, industrial waste treatment technology is expensive and not always effective. Among the individual organic chemicals, the most prevalent at superfund sites are trichloroethylene (TCE) and perchloroethylene (PCE). Because the natural attenuation of TCE and PCE appears to be slow, there is a great interest in finding ways to either accelerate degradation processes or use environmentally-friendly processes to remove the halocarbons.

Current methods for decontaminating ground water systems contaminated with halogenated hydrocarbon compounds or solvents involve pumping the water out of the reservoir and treating it with an "air stripping" treatment procedure. Halogenated hydrocarbons have also been remediated by a photolysis procedure wherein contaminated soil or sediment is placed on an oxide film and irradiated with concentrated sunlight to remove chloride atoms. These procedures are expensive and only successful if all of the contaminated material has been successfully removed from the site of contamination. Effective in situ treatment is not practiced because of a lack of treatment technology. Bioremediation has not been successful because maintenance of a viable microorganism population is not generally feasible in subsurface ecosystems. Chemical remediation processes have not been utilized because of the delivery of large amounts of the necessary chemicals and problems associated with groundwater hydrology.

Scientists have been studying the effects of metal powders or filings on halogenated hydrocarbon degradation kinetics. For example, Senzaki and Yasuo have reported the kinetics of the chemical reduction of organochloro compounds by treatment with iron powder. (Senzaki, T. and Yasuo, K., "Removal of organochloro compounds in water by reductive treatment: Reductive degradation of 1,1,2,2 tetrachloroethane with iron powder", *Kogyo Yosiu*, 357: 2–7 (1988); Senzaki, T. and Yasuo, K., "Removal of Organic Chlorine Chemical Compounds by Use of Some Reduction Processes: Processing Trichloroethylene with iron powder", *Kogyo Yosiu*, 369: 19–25 (1989)) More recently, Matheson and Tratnyek have reported the kinetics of the reaction of carbon tetrachloride and TCE with elemental iron (Matheson, L. J. and Tratnyek, P. G., "Reductive dehalogenation of chlorinated methanes by iron metal", Environ. Sci. Toxicol. 28: 2045 (1994)) and Gillham has reported removal of 90% of TCE and 88% of PCE from aquifer groundwater by passage through a 1.5 m thick permeable reactive wall consisting of 22 wt % granular iron and 78 wt % sand. (Gillham, R. W., Book of Abstracts, 209th ACS National Meeting, Vol. 35: 691–693, Apr. 2–7, 1995.) However, the observed kinetics of these reactions are slow, and the reactions often result in insufficient or incomplete degradation. Others have tried to find ways to enhance the speed of the reaction using catalysts or anaerobic conditions. For example, U.S. Pat. No. 4,382,865 to Sweeny discusses degradation of certain reducible organic compounds in waste water streams by passing the stream through a column or reservoir containing copper-catalyzed iron, and U.S. Pat. No. 5,266,213 to Gillham discusses the remediation of groundwater contaminated with halogenated organic compounds in which the water is passed through a trench or into an enclosed tank containing iron filings under strictly anaerobic conditions. However, these methods fail to provide degradation of halogenated hydrocarbons in soils and sediments and fail to provide complete degradation of halogenated hydrocarbons in aquifers in a rapid, efficient and inexpensive manner.

Pesticides

A large number of pesticide-contaminated sites exist throughout the world, posing both human and ecological risks. These sites include contaminated soils, sediments and natural waters that have occurred as a result of industrial spills, agricultural applications, and environmental transport phenomena. Many of the pesticides contaminating these sites are known to be extremely toxic and persistent in the environment. Therefore, technology is needed to remediate these contaminated sites.

Some of the most environmentally persistent pesticides are the chlorinated aliphatics such as toxaphene, DDT, chordane, lindane, heptachlor, endrin, dieldrin, aldrin, and methoxychlor. Many superfund sites throughout the United States have been identified as contaminated with these and similar pesticides. No rapid environmental transformation pathways exist for many of these compounds, resulting in a lack of natural attenuation. For example, toxaphene is so long-lived in the environment that it has been suggested that it could outlive mankind.

Classes of pesticides that are somewhat less persistent still pose pollution problems in sediments, soils, and natural waters, and require remediation technology to clean up the sites. For example, the organophosphates organophosphorothioates and organophosphoro-dithrionates, while not as persistent as the halogenated hydrocarbons, are more widely used and contaminate many sites. These classes of pesticides include methyl parathion, chloropyriphos, fenthion and malathion. Also included within these classes of less persistent compounds are many chemical warfare agents such as the nerve gases.

Some attempts have been made to provide methods for the remediation of pesticides using metals. For example, U.S. Pat. No. 3,640,821 to Sweeny et al. discusses reductive degradation of the pesticide DDT by reacting the DDT with finely divided zinc at a pH less than 4, and U.S. Pat. No. 3,737,384 to Sweeny et al. discusses decomposition of DDT by reaction with a metal, such as iron, coated with a thin layer of a catalytic metal such as copper or silver under mildly acidic conditions. However, these methods are inefficient, time-consuming and expensive, and the metals are often toxic.

Dye and Dye Wastes

Dye manufacturing and fiber dying processes generate large quantities of dye wastes in the United States. Many of these dyes, dye mixtures, and other components of dye waste are large molecular weight compounds that are poorly degraded by biotic processes in waste water treatment systems or in the receiving waters. Also, the releasing of dye wastes in environmental receiving waters is partially regulated based on the color of the waste water effluent. U.S. Pat. No. 4,194,973 to Smith describes treatment of certain dyes with Fe(II) in the presence of iron. However elevated temperatures are required for efficient remediation, and the products produced by these reactions are not known. Thus, methodology is needed that will inexpensively decompose these large dye molecules into lower molecular weight compounds with concurrent loss of color so that biotic processes may prevail. One area in which this need exists is in those industries discharging waste waters containing chromophoric compounds such as aryl azo- or aryl nitro-containing compounds. In particular, remediation of dyes such as Direct Blue 75, Disperse Blue 79, Acid Red 4 (Acid Eosine G), Acid Blue 40, Direct Yellow 137, Direct Red 24, and Acid Yellow 151 is needed.

It would be of great environmental benefit to have an inexpensive method of degrading contaminants such as halogenated hydrocarbons, pesticides, and dyes in soils, waters, sediments, and aquifer materials that results in products that are environmentally acceptable.

SUMMARY OF THE INVENTION

Methods and compositions for the remediation of contaminants of soil, water, sediment and aquifers are disclosed wherein the contaminant is combined with a metal and sulfur-containing compound under conditions that cause chemical reduction of the contaminant to an environmentally acceptable product or products. The metal and sulfur-containing compound may be added as separate components or added to the contaminant as a mixture or single compound. The method is useful for treating contaminants such as halogenated hydrocarbon compounds and solvents, pesticides, chemical warfare agents such as nerve gases and dyes, dye mixtures and dye wastes.

The metal is preferably a zero-valent metal, such as metallic iron ($Fe^0$), in a comminuted form, such as iron filings or iron powder for increased surface area exposure to the contaminant. The metal provides a hydrogen source. The preferred sulfur-containing compound is iron sulfide ($FeS_2$), otherwise known as pyrite or iron disulfide. In one embodiment of the present method, the metal contains at least approximately 5% sulfur as an impurity.

For remediation of contaminated soils or sediments, the addition of an alcohol or surfactant to the reactants enhances the rate of remediation by facilitating desorption of the contaminant from the soil or sediment.

In accordance with the method, the contaminated soil, water, sediment, aquifer material, or container is reacted with the remediating composition containing the metal and sulfur-containing compound for a sufficient amount of time to allow chemical reduction of the contaminants to an environmentally-acceptable product in accordance with procedures and methods well known to those skilled in the art.

It is therefore an object of the present invention to provide an efficient method of remediating environmental contaminants.

It is a further object of the present invention to provide a method of remediating environmental contaminants that can be carried out in situ and in batch reactors as well as flow systems such as columns and extraction systems.

It is a further object of the present invention to provide a rapid method for the chemical reduction of contaminants to environmentally acceptable products.

It is a further object of the present invention to provide a method of remediating environmental contaminants that is simple, cost-effective, and employs naturally occurring or environmentally acceptable reagents that need not be subsequently removed from the remediated site.

BRIEF DESCRIPTION OF THE DRAWINGS

FIG. 1 is a graph of the disappearance rate coefficient (1/days) of TCE with the addition of $10^{-7}$ M "extra pure" iron powder (6–9 $\mu$m, >99.8%) and increasing concentrations of sodium sulfide.

FIG. 2 is a graph of pH over time of iron in water, iron in water plus pyrite, and pyrite in water.

FIG. 10 is a graph showing the concentration of toxaphene over time in days for soil sediment sample identification number SS-C10-C after treatment with a mixture of iron powder and iron pyrite in 30% ethanol.

FIG. 11 is a graph showing the concentration of toxaphene over time in days for soil sediment sample identification number SS-F05-C after treatment with a mixture of iron powder and iron pyrite in 30% ethanol.

FIG. 12 is a graph showing the concentration of toxaphene over time in days for soil sediment sample identification number SS-H07-C after treatment with a mixture of iron powder and iron pyrite in 30% ethanol.

FIG. 13 is a graph showing the concentration of toxaphene over time in days for soil sediment sample identification number SS-H10-C after treatment with a mixture of iron powder and iron pyrite in 30% ethanol.

DETAILED DESCRIPTION OF THE INVENTION

Figure 3:
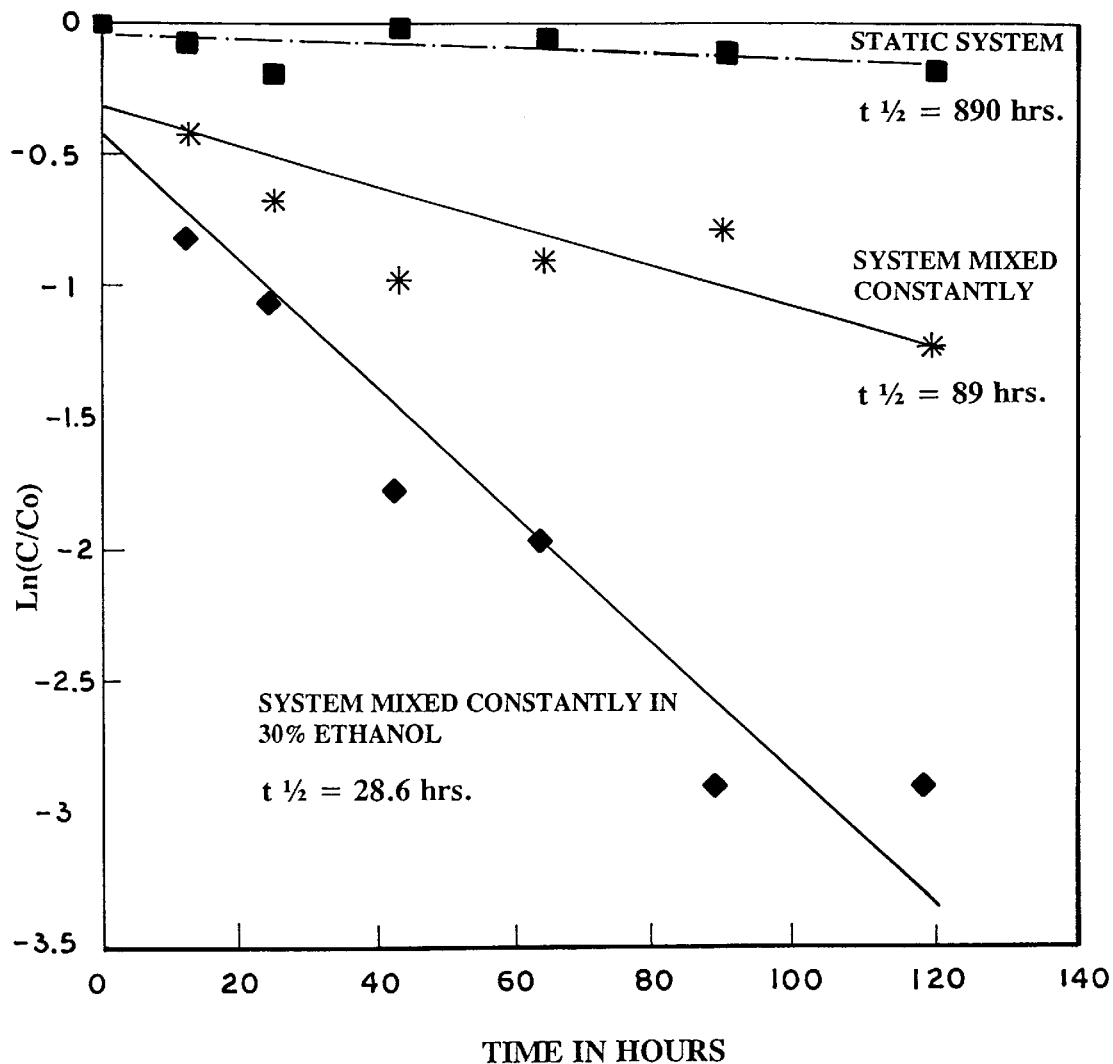
FIG. 3 is a pseudo-first-order disappearance kinetic plot of toxaphene concentration over time for a contaminated soil sample in an iron/pyrite/water static batch reactor (square), an iron/pyrite mixed batch reactor (asterisk), and an iron/pyrite/ethanol mixed batch reactor (diamond). Each sample contains 4.5 g of soil, 3 g of iron, and 0.1 g of pyrite in 100 ml deionized water.

Methods and compositions for remediating contaminants in soil, water, sediment, and aquifers to environmentally-acceptable products are provided. The environmental contaminants are chemically reduced by reacting a contaminant with a remediating composition containing a metal and a sulfur-containing compound. The metal is one that provides a hydrogen source, such as a zero-valent metal. The sulfur-containing compound is preferably a transition metal sulfide. The composition contains one or more compounds containing the metal and sulfur-containing compound. The contaminant is reacted with the remediating composition for a sufficient amount of time to allow chemical reduction of the contaminant. The metal and sulfur may be contained in a single compound, most preferably the compound iron sulfide ($FeS_2$), otherwise known as pyrite, and chemical reduction achieved in the presence of a hydrogen source such as a zero-valent metal or hydrogen gas.

It will be understood by those skilled in the art that the metal and sulfur may be combined and then added to the contaminated soil, water, sediment or aquifer material, or the components may be added individually to the contaminant in any order, or the metal and sulfur-containing compound may be contained in a single compound, which is added to the contaminant in the presence of a hydrogen source as described in more detail below.

The metal is added to the environmental contaminant as a solid. The sulfur-containing compound may be added to the environmental contaminant as a solid or as a solution, emulsion, or suspension. If soluble, the remediating composition may be dissolved in water or any conventional solvent in accordance with methods known to those skilled in the art.

The reactants are reacted by mixing the contaminant to be remediated with the source of metal and source of sulfur using standard mixing techniques such as shaking, stirring, vortexing, rotating, flow through and continuous extraction and land farming. If the contaminant is present in water or aquifer material, then the water or aquifer material may be pumped out of the ground or diverted to a column or reservoir containing the remediating composition, or the remediating composition may be added directly to the water or aquifer material in situ. If the contaminated site is soil or sediment, the most efficient means of remediation involves adding the remediation composition directly to the site for in situ remediation. The amount of remediating metal and sulfur-containing composition added to contaminant to achieve effective remediation is preferably 0.1 to 25%.

The temperature and pH of the reaction may affect the rate of reaction. Preferably, the temperature is between approximately 6 and 37° C., more preferably between approximately 6 and 25° C. The rate of reaction is generally faster at higher temperatures. The rate of the reaction is fairly constant for acidic to neutral initial pH's and drops off rapidly as the pH rises above 8. As discussed in more detail below, the addition of pyrite to a remediating composition containing iron helps to maintain the pH of the reaction below 8, thereby enhancing the rate of the degradation reaction. The most preferred pH is between approximately pH 5 and pH 6.5.

The addition of an alcohol or surfactant to the reactants enhances the rate of the remediation reaction, particularly if the contaminated substance is soil or sediment, by desorbing the contaminant from the soil or sediment, thereby rendering it more accessible to the remediating reactants.

As mentioned above, the remediation method can be carried out in a variety of reactors including columns, reservoirs, or batch reactors. Alternatively, the contaminated site can be remediated in situ without removing the soil, water, or sediment from the ground. Preferably, the remediating composition is composed of substances naturally occurring in the environment, such as iron and iron sulfide, or substances that are environmentally acceptable, such as ethanol, so that the remediating composition need not be removed from the remediated site after degradation of the contaminants.

Remediating Metal and Sulfur-Containing Composition

The remediating metal and sulfur-containing composition for chemically reducing environmental contaminants contains a metal source and a sulfur source. The preferred metal source is a zero-valent metal such as iron or an iron-containing compound, most preferably metallic iron ($Fe^0$) in a comminuted form such as iron filings or iron powder, which may be obtained from a commercial chemical supplier such as Fisher Scientific, Pittsburgh, Pa. The comminuted metal preferably has a particle size of between approximately 0.1 and 2.

Commercial iron, such as general laboratory grade iron filings, usually contains some carbon, phosphorus, silica, sulfur, and manganese. Commercial iron may therefore be used alone as the remediating metal and sulfur-containing composition because it contains both components. For enhanced reaction kinetics, an additional sulfur source, such as elemental sulfur or pyrite, should be added to the commercial iron. Extra pure iron, such as reduced iron powder, may be used, but must be added to the contaminant in the presence of a source of sulfur to achieve effective chemical reduction of the contaminant. The preferred sulfur-containing compound is a sulfide. The minimum amount of sulfide required is approximately 0.1%. If sulfur is not present in the iron, then sulfur may be added to the contaminant either before, after, or simultaneously with addition of the iron to the contaminant. The preferred amount of sulfur in the remediating iron composition is between approximately 0.1 and 25%. As shown in FIG. 1, the disappearance rate of a contaminant such as TCE increases as the concentration of sulfide (NaHS) is increased.

The preferred source of sulfur is a compound containing sulfur such as a transition metal sulfide. Suitable sulfur-containing chemicals include, but are not limited to, sodium hydrogen sulfide (NaHS), iron sulfide ($FeS_2$), nickel sulfide, copper sulfide, zinc sulfide and cadmium sulfide. The most preferred source of sulfur is iron sulfide. Iron sulfide is also known as pyrite, iron pyrite, or "fool's gold". Pyrite is a widely occurring mineral sulfide available from commercial chemical suppliers such as Ward Scientific (Rochester, N.Y.). Because transition metal sulfides, such as pyrite, contain both a metal source and a sulfur source, they may be added alone for effective remediation of contaminants. Most preferably, an additional metal source, preferably in the form of zero-valent metal powder or filings, is added in combination with the sulfide for superior remediation results. The preferred ratio of metal to sulfide in the remediation composition is approximately between 20:1 and 5:1. However, if the transition metal sulfide is added as the sole source of both the metal and the sulfur, then it should be added in the presence of a hydrogen source, such as hydrogen gas, for effective remediation.

Although not wishing to be bound by the following theory, it is believed that the combination of metal and sulfide provides superior remediation results because the metal chemically reduces the contaminant and the sulfur-containing compound acts as a buffer to maintain the pH of the reaction mixture containing the contaminant, metal and sulfur-containing compound at the optimal pH, preferably a pH between approximately pH 5 and pH 7.5, as shown in FIG. 2, and thereby improves degradation, particularly dehalogenation. In FIG. 2, 50 ml of distilled water was mixed with 10 g iron, 50 ml of distilled water was mixed with 10 g iron and 1 g pyrite, and 50 ml of distilled water was mixed with 1 g pyrite and the pH was measured at 0, 10, 25 and 110 days. The pH-time profiles for iron, iron plus pyrite, and pyrite in distilled water show that pyrite in the system maintains an acidic pH, which is optimal for reductive remediation.

A sulfide, such as pyrite, serves as not only the source of sulfur for the reaction, but also serves as a source of protons (acid) to maintain the desirable low pH (pH 5 to 6.5) in the system. Iron is more efficient in reducing halogenated hydrocarbons in water at pHs below pH 7. This is because zero valent iron reacts with oxygen and with water to produce a ferrous oxide precipitate (FeOOH), which forms a white coating on the surface of the iron at a pH above 7, This coating reduces the remediation efficiency of the iron. Pyrite reacts with the oxygen in the system to produce protons ($H^+$), thereby continually reducing the pH.

Alcohol/Surfactant

As mentioned above, the remediation reaction rate for remediation of soils or sediments may be increased by the presence of an alcohol or a surfactant, or mixture thereof, in the reaction mixture. The metal, sulfur source and alcohol, surfactant or mixture are combined with contaminated soils or sediments and allowed to react, with or without mixing. The role of the metal is to provide electrons for the reduction reactions, the sulfur source, preferably pyrite, maintains the pH below 7 and serves as the sulfur source, and the alcohol or surfactant serve as a solubilizing agent to solubilize the contaminant. The solubilization overcomes the mass transport limitations. Preferably, the alcohol or surfactant has a concentration of between approximately 2 and 40% (v/v) in water, most preferably approximately 15–20% (v/v) alcohol in water. The preferred alcohol is ethanol.

A comparison of toxaphene degradation by treatment of a contaminated soil sample with iron and pyrite in a static system, a constantly mixed system, and a constantly mixed system containing 30% ethanol is shown in FIG. 3.

Figure 4:
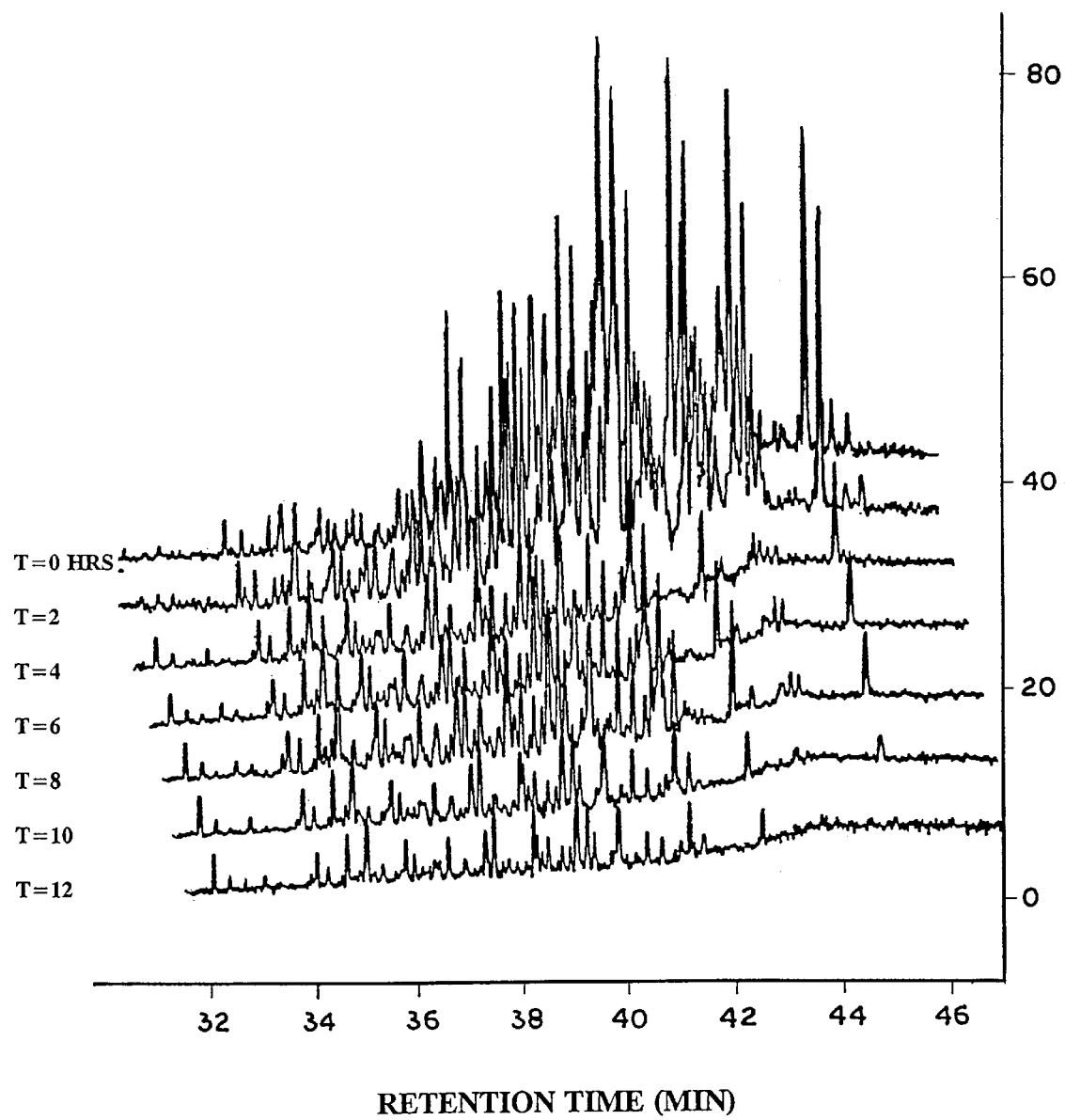
FIG. 4 is a time series of gas chromatograms of concentration of toxaphene versus retention time at various time points after treatment with 10% (w/w) iron and 1.0% (w/w) pyrite in 30% ethanol.

FIG. 4 shows a time series of gas chromatograms showing the disappearance of toxaphene components in a toxaphene contaminated soil sample using 10% (w/w) iron (Fisher Scientific, Pittsburgh, Pa., #157–500) and 1.0% (w/w) pyrite (Ward Scientific, Rochester, N.Y.) in 30% ethanol. The initial concentration of toxaphene was 250 ppm.

Contaminants

The method and compositions described herein are useful for treating contaminants such as halogenated hydrocarbon compounds or solvents, pesticides, chemical warfare agents such as nerve gases and dyes, dye mixtures, and other components of dye waste. The method is particularly useful for treating contaminated soil, sediment, water, aquifer materials, or containers that have held chemical warfare agents such as nerve gases. The remediation reaction preferably results in the removal of halogens from the contaminant, yielding a dehalogenated organic compound that is environmentally acceptable.

Halogenated hydrocarbons are defined herein as halogenated organic compounds or solvents such as the chlorinated hydrocarbons 1,1,2-trichloroethene (TCE); 1,1,2,2-tetrachloroethene (PCE); cis 1,2-dichloroethene (cisDCE); dichloromethane (DCM); trichloromethane (TCM); tetrachloromethane (PCM); 1,2-dichloroethane (12 DCA); 1,1-dichloroethene (11 DCE); 1,1,1-trichloroethane (111 TCA); 1,1,2-trichloroethane (112 TCA); 1,1,2,2-tetrachloroethane (1122 PCA); 1,1,1,2-tetrachloroethane (1112 PCA); hexachloroethane (HCA); monochloroethene (MCE); trans 1,2-dichloroethene (transDCE); trichloroethylene, halogenated pesticides, dyes, and other industrial chemicals such as halogenated aromatics, such as pentachlorophenol (PCP); the brominated hydrocarbon 1,1,2,2-tetrabromoethene (PBE); the iodinated hydrocarbon periodoethylene (PIE), and other chloro-, bromo-, and iodo-ethenes, ethanes and methanes. The major products produced by treatment with the remedial metal and sulfur-containing composition include hydrogen, nitrogen, methane, ethyne, ethene and ethane.

Figure 5:
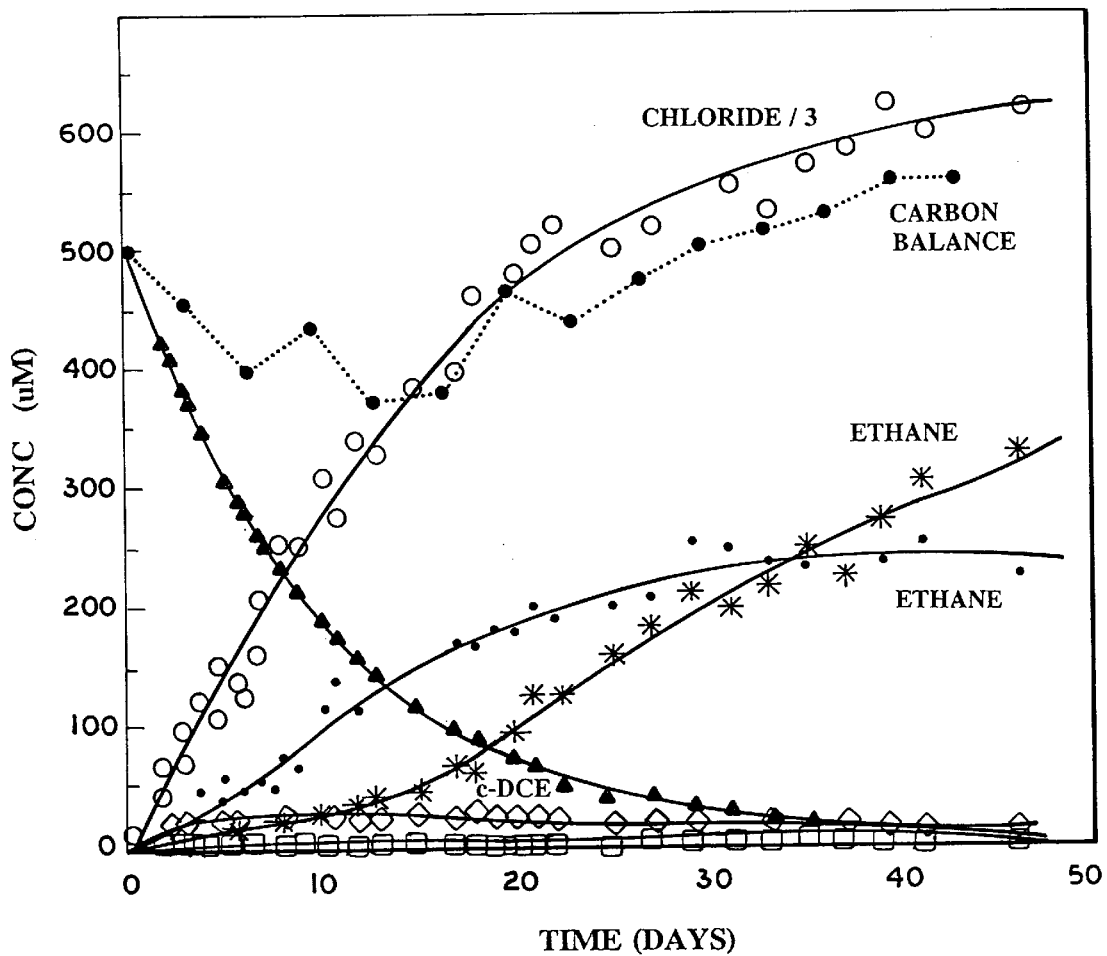
FIG. 5 is a graph showing the concentration of reaction components versus time of TCE (star), cis DCE (diamond), ethyne (large square), ethene (small square), ethane (asterisk), and chloride/3 (open circle). The carbon balance is also shown (closed circle).
Figure 6:
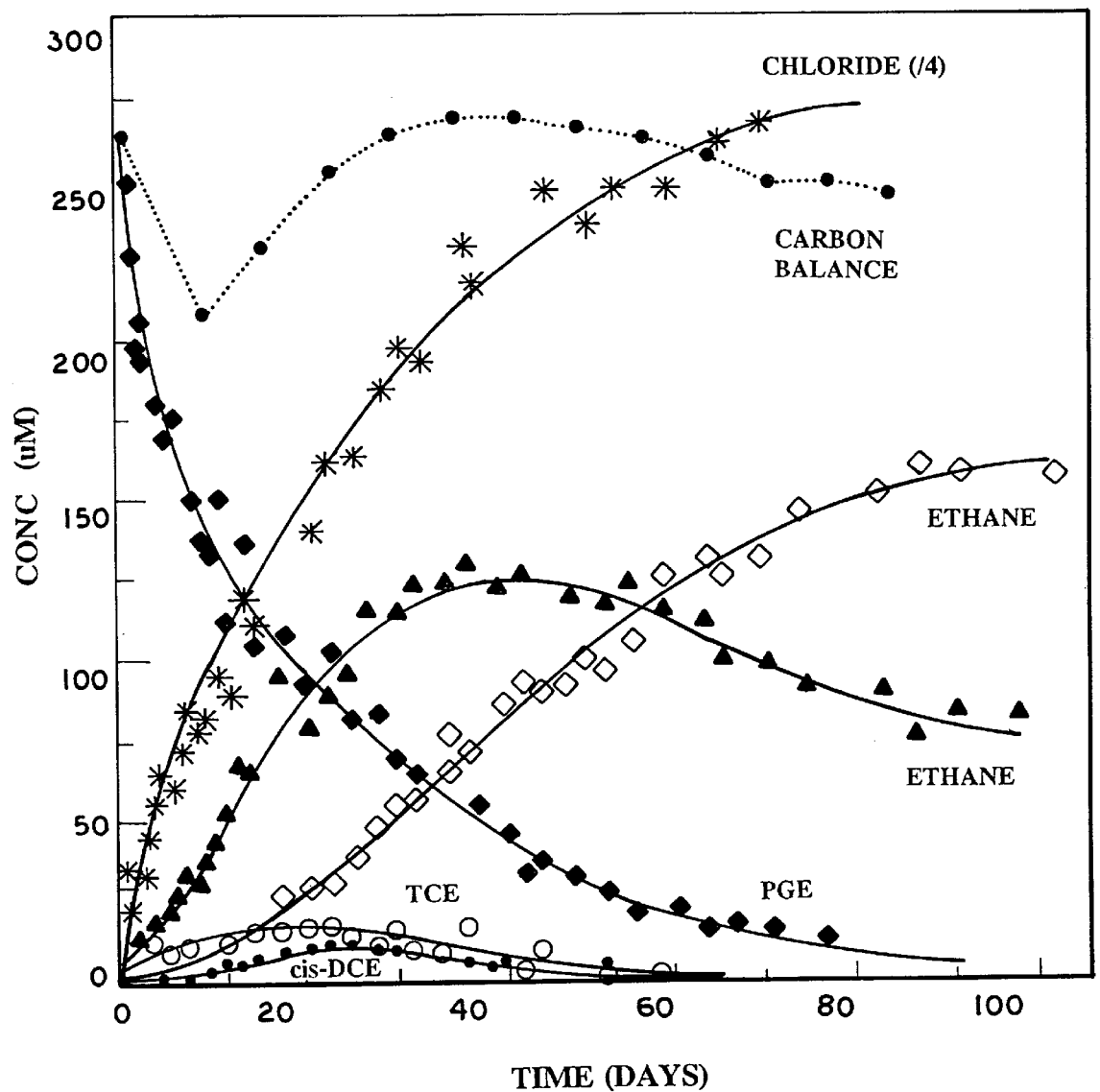
FIG. 6 is a graph showing the concentration of reaction components versus time of PCE (closed diamond), TCE (open circle), cis DCE (small square), ethene (star), ethane (open diamond), and chloride/3 (asterisk). The carbon balance is also shown (closed circle).

The chemical degradation of TCE is shown in FIG. 5, which is mass balance-time plot for TCE degradation in the presence of iron and pyrite showing the rate of disappearance of TCE, the rates of formation and disappearance of intermediates, and the rates of formation of the dehalogenated hydrocarbon end products. A similar mass balance diagram for PCE degradation using the iron and pyrite system is shown in FIG. 6.

Environmentally-persistent pesticides that may be remediated by the methods and compositions described herein include, but are not limited to, the chlorinated aliphatics such as toxaphene (chlorinated camphene), DDT (dichlorodiphenyltrichloroethane), chlordane (1,2,4,5,6,7,8,8-octachloro-4,7-methane-3α,4,7,7α-tetrahydroindane), lindane (gamma benzene hexachloride), heptachlor (1,4,5,6,7,8,8-heptachloro-3α,4,7,7α-tetrahydro-4,7-methanoindene), endrin (1,2,3,4,10,10-hexachloro-6,7-epoxy- 1,4,4α,5,6,7,8,8α-octahydro-endo, endo-1,4:5,8-dimethanonaphthalene), dieldrin (3,4,5,6,9,9-hexachloro-1α,2,2α,3,6,6α,7,7α-octahydro-2,7:3,6-dimethanonaphth[2,3-β]oxirene), aldrin (1,2,3,4,10,10-hexachloro-1,4,4α,5,8,8α-hexahydro-1,4:5,8-dimethanonaphthalene), and methoxychlor (1,1,1-trichloro-2,2-bis(p-methoxyphenyl)ethane).

Pesticides considered less persistent than those mentioned above that may be remediated by the methods and compositions described herein include, but are not limited to, pesticide classes such as the organophosphates and organophosphorothioates, which include methyl parathion (phosphorothioic acid O,O-dimethyl O-(4-nitrophenyl) ester), chloropyrifos (phosphorothioic acid' O,O-diethyl O-(3,5,6-trichloro-2-pyridinyl) ester), fenthion (phosphorothioic acid O,O-dimethyl O-[3-methyl-4-(methylthio)phenyl]ester), and malathion ([(dimethoxyphosphinothioyl)thio]butanedioic acid diethyl ester), chloropicrin, and chemical warfare agents such as the nerve gases.

Additional pesticides that may be remediated by the present method include myrix, kepone, and pentachlorophenol.

The dyes, dye mixtures, and other components of dye waste that may be remediated by the methods and compositions described herein are generally large molecular weight compounds that are poorly degraded by biotic processes, including, but not limited to, aryl azo- or aryl nitro-containing compounds, such as Direct Blue 75, Disperse Blue 79, Acid Red 4 (Acid Eosine G), Acid Blue 40, Direct Yellow 137, Direct Red 24, and Acid Yellow 151. The remediating metal and sulfur-containing composition is effective in cleaving the chromophores from the dyes, thereby removing the color so the dye wastes, which are regulated by the U.S. EPA based on the color of the effluent, may be discarded. Removal of the chromophores also results in the formation of lower molecular weight molecules that are readily degraded by other processes such as biodegradation.

The present invention will be further understood by reference to the following non-limiting examples.

EXAMPLE 1

Reduction of Halogenated Hydrocarbons with Iron and Sulfide

The reaction kinetics of halogenated hydrocarbon remediation in aqueous solutions by metallic iron and sulfide were determined.

Materials and Methods

Commercial, metallic iron ($Fe^0$) in the form of degreased iron filings having an approximate mesh size of 40, with a reported purity of +85% was purchased from Fisher Scientific Co., (Pittsburgh, Pa.). Extra pure iron in the form of reduced iron powder having a diameter of 6–9 $\mu$m was obtained from AESAR/Johnson Matthey (Ward Hill, Mass.) to study the effect of iron purity. Water used for all experiments was purified by reverse osmosis to a specific resistance of >15 megohm. Sodium hydrogen sulfide (NaHS) was Purchased from Strem Chemicals (Newburyport, Mass.) 1,1,2-trichloroethene (TCE); 1,1,2,2-tetrachloroethene (PCE); cis 1,2-dichloroethene (cisDCE); dichloromethane (DCM); trichloromethane (TCM); tetrachloromethane (PCM); 1,2-dichloroethane (12 DCA); 1,1-dichloroethene (11 DCE); 1,1,1-trichloroethane (111 TCA); 1,1,2-trichloroethane (112 TCA); 1,1,2,2-tetrachloroethane (1122 PCA); 1,1,1,2-tetrachloroethane (1112 PCA); and hexachloroethane (HCA) were purchased from Aldrich Chemicals (Milwaukee, Wis.). Monochloroethene (MCE) and trans 1,2-dichloroethene (transDCE) were purchased from Sigma Chemical Co. (St. Louis, Mo.), and 1,1,2,2-tetrabromoethene (PBE) was purchased from ICN Biomedicals (Irvine, Calif.).

All halocarbon solutions were prepared from dilutions of "saturated plus excess" stock solutions. Saturated stock solutions were prepared by adding an excess of halocarbon to a volume of reverse osmosis purified water in brown glass bottles.

Unless otherwise indicated, 2.0 g (15% w/w) of the metallic iron was weighed into 16×125 mm glass disposable culture tubes (17.0 ml), then 12.5 ml of the solution containing the halogenated hydrocarbon was added and the vials rapidly capped with aluminum foil-faced butyl rubber septa-lined caps. The reaction mixture volumes were approximately 13.5 ml, giving 3.5 ml of headspace above the solution. A set of control samples consisting of only halocarbon solution was run simultaneously for analysis of volatilization or hydrolysis losses. A second set of control samples containing iron and pure water was also included. Aliquots of samples and controls were removed at specified times throughout the run and either immediately analyzed or frozen until analyzed. For the GC/MS analysis, 2.0 ml of reagent grade acetonitrile was added to both the samples and the controls through the septa. Samples were then stirred vigorously and then centrifuged. This method efficiently desorbed the analyte from the surfaces and minimized the concentration of volatiles in the headspace. Headspace partitioning corrections were applied for the quantitation of volatiles and fixed gases using Henry's Law constants.

Gas-liquid chromatography/mass spectrometry (GC/MS, Hewlett Packard 5890 series II gas chromatograph, Wilmington, Del.) was used for the quantitative and qualitative determination of all volatile compounds. All analyses were performed using direct aqueous injection of 0.5 $\mu$l samples via an on-column injector. Helium was used as the carrier gas. The separation column was a 40 M×0.18 mM×0.4 $\mu$M DB-1 (methyl silicone) column fitted with one meter of a 0.53 mM ID deactivated fused silica guard column at the inlet end (Alltech Associates, Inc., Deerfield, Ill.). Detection was performed with a Hewlett Packard 5971 quadrupole mass selective detector.

Gas-solid chromatography (GC) was used for the quantitative and qualitative determination of fixed gases using a Hewlett Packard 5890 chromatograph. Sample headspace was withdrawn and injected with a gas tight syringe onto a ⅛" packed column (Supelco 15 M Carboxen 1000, Bellefonte, Pa.) Detection was performed with a thermal conductivity detector. Helium was used as the carrier and detector reference gas.

Anionic species were analyzed by ion-exchange chromatography using a Waters 590 pump and Waters 431 detector (Waters Corp., Milford, Mass.). A Waters IC-Pak Anion column equipped with a Waters IC-Pak Anion Guard Pack pre-column were used for the separation. The eluant was a borate-gluconate solution, pH 8.5.

Effect of Iron Concentration

To test the effect of different amounts of iron on the reaction, a series of constant volume batch runs were performed on the TCE plus $Fe^0$ reaction. Various amounts of iron were weighed into reaction vessels and the TCE solution was added to give a constant final volume of reaction mixture. The quantity of iron was calculated as a weight percentage wherein 1 ml of solution was assumed to equal 1 g. The disappearance of analyte was followed and first-order disappearance rate constants were determined as a function of varying amounts of added $Fe^0$. The results are shown in Table 1 below, which demonstrate that the rate of TCE degradation increases as the amount of iron increases. Similar results are plotted in FIG. 5. A mass balance-time plot for PCE treated with iron and pyrite is shown in FIG. 6.

TABLE 1

The effect of iron quantity on first-order reduction rate constants for TCE

| Reaction | $Fe^0$ (w/w) % | Rate ($d^{-1}$) | Half-life (days) |
| --- | --- | --- | --- |
| TCE + Fe | 0.14% | 0.018 | 39.7 |
| TCE + Fe | 1.43% | 0.017 | 41.2 |
| TCE + Fe | 7.14% | 0.017 | 40.3 |
| TCE + Fe | 14.3% | 0.021 | 33.5 |
| TCE + Fe | 79.4% | 0.070 | 9.9 |

Effect of Sulfide Concentration

It was noted that the reaction rate constant was inversely dependent on the purity of the iron used. A batch kinetic experiment was set up to test the effect of sulfide concentration on the reaction rate. A series of runs were set up using a constant quantity of "extra pure" (>99.9%) metallic iron and various concentrations of sulfide. Sulfide was added as a NaHS solution. The initial TCE concentration was 100 $\mu$M. The initial Fe$^0$ amount was 3.7% (W/W) at 25° C. The results are shown in Table 2 below, which demonstrates that the rate of the reaction increased as the concentration of sulfide increased. Similar results are plotted in FIG. 1.

TABLE 2

The effect of sulfide concentration on first-order reduction rate constants for TCE

| Reaction | pure Fe$^0$ (w/w) % | [NaHS] ($\mu$M) | Rate (d$^{-1}$) | Half-life (days) |
| --- | --- | --- | --- | --- |
| TCE + Fe | 3.7% | 0.0 | 0.0175 | 39.7 |
| TCE + Fe | 3.7% | 0.71 | 0.0168 | 41.2 |
| TCE + Fe | 3.7% | 7.14 | 0.0172 | 40.3 |
| TCE + Fe | 3.7% | 36.7 | 0.0207 | 33.5 |
| TCE + Fe | 3.7% | 71.4 | 0.0703 | 9.9 |
| TCE + Fe | 3.7% | 179 | 0.0720 | 9.6 |
| TCE + Fe | 3.7% | 367 | 0.0911 | 7.6 |
| TCE + Fe | 3.7% | 714 | 0.0968 | 7.2 |
| TCE + Fe | 3.7% | 1787 | 0.1553 | 4.5 |
| TCE + Fe | 3.7% | 3574 | 0.1882 | 3.7 |

Figure 7:
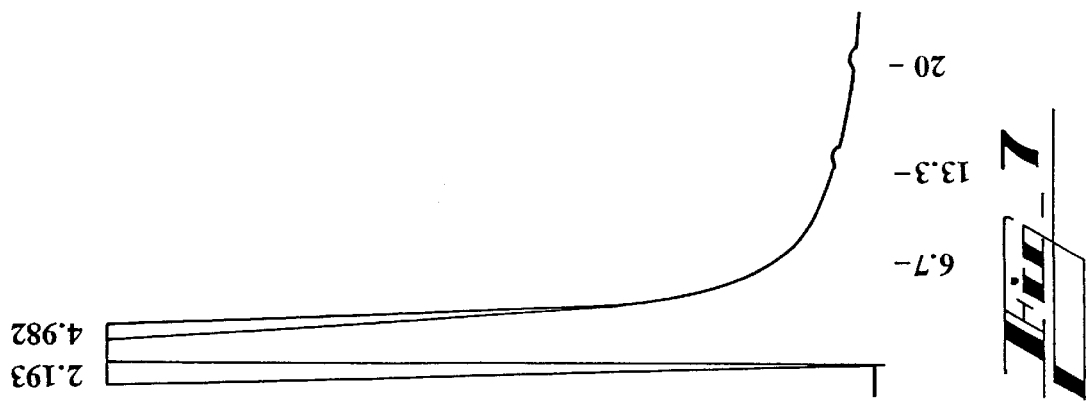
FIG. 7 is a line drawing of a chromatogram of the gas products of the reaction of TCE with "extra pure" iron.
Figure 8:
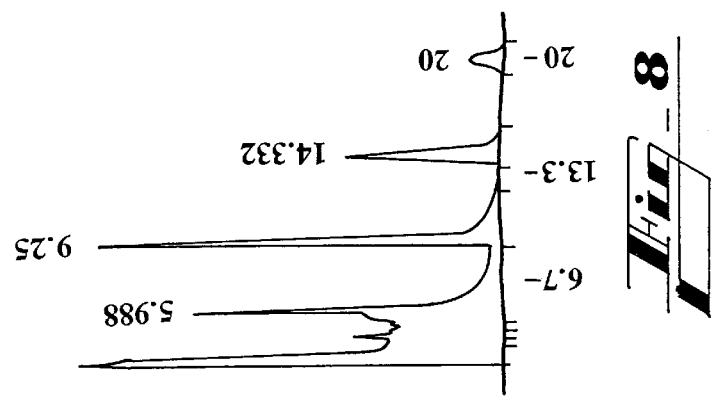
FIG. 8 is a line drawing of a chromatogram of the gas products of the reaction of TCE with general, commercial or laboratory grade iron filings, showing accumulation of dicarbon atom gases.
Figure 9:
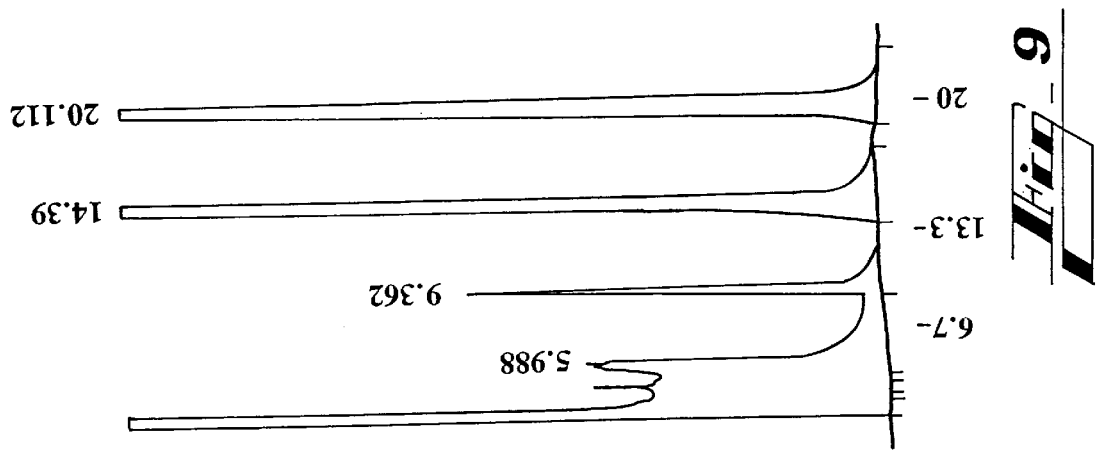
FIG. 9 is a line drawing of a chromatogram of the gas products of the reaction of TCE with general, commercial or laboratory grade iron filings and sodium hydrogen sulfide, showing that the addition of sodium hydrogen sulfide not only converts the non-reactive iron into a reactive iron, but also increases the amount of the products formed as compared to that shown in FIG. 6.

Gas analysis was performed on samples withdrawn from the headspace of the sample-containing vials after a 24 hour reaction time between TCE and the two different grades of iron powder, commercial grade and extra pure grade. In FIGS. 7–9, the peak in the chromatogram labeled as peak 1 represents acetylene, the peak in the chromatogram labeled as peak 2 represents ethylene, and the peak in the chromatogram labeled as peak 3 represents ethane. As shown in FIG. 7, which shows a chromatogram of the gas products of the reaction of TCE with the extra pure iron, none of the dicarbon atom gases, namely ethyne, ethene, or ethane, the main reduction products of TCE, were found. This indicates that the extra pure iron, despite its very small particle size (6–9 $\mu$m), fails to initiate the reduction reaction of TCE. In contrast, FIG. 8, which shows a chromatogram of the gas products of the reaction of TCE with general, commercial or laboratory grade iron filings, shows accumulation of the dicarbon atom gases in the headspace of the reaction bottle. This indicates that iron filings, that contain more impurities including sulfur and a much smaller surface area (approximately 40 mesh) is capable of initiating the reduction reaction of TCE. As evident from the chromatogram shown in FIG. 9, addition of sodium hydrogen sulfide to the extra pure iron not only converts the non-reactive iron into a reactive iron, but also increases the amount of the products formed as compared to that shown in FIG. 8.

EXAMPLE 2

Reduction of Toxaphene with Iron and Iron Pyrite With and Without Ethanol

Two series of experiments, each consisting of ten samples were performed to study the use of a mixture of iron filings and iron pyrite for reduction of toxaphene. In the first series, water was used as the reaction medium. In the second series, 30% ethanol in water was used as the solvent medium.

Materials and Methods

Four toxaphene-contaminated sediments samples were collected. Each sample was thoroughly mixed and passed through sieve number 40. The Toxaphene™ content of each soil sample was determined by adapting the extraction and analysis protocols currently used for microbial degradation studies on PCB congeners, in which an acetone extract of the sediment was transferred into a separating funnel containing hexane as the upper phase and a sodium chloride solution as the lower phase. The separated hexane layer containing the toxaphene and other pesticides was subjected to a clean-up process by passing the hexane layer over florisil. Toxaphene™ was eluted using diethyl ether:hexane (2:8 v/v) and analyzed by GC/ECD using a DB 5 column in accordance with the methods described by Andrews, P., et al., "High Resolution Selective Ion Monitoring GC-MS Determination of Toxaphene in Great Lakes Fish", *Chemosphere* 27: 1865–1872 (1993). The chromatographic peak with a retention time of 27.9 minutes was used for quantitation of toxaphene because of its high sensitivity due to its large integrated area and of its location far from the retention time of the other pesticides present in these soils. The identification label and average concentration and standard deviation of triplicate analysis of toxaphene in each of the four sediments are set forth in Table 3 below.

TABLE 3

Average Concentration and Standard Deviation of Triplicate Analysis of Toxaphene ™ in Sediments

| Sediment I.D. | Avg. Conc. (mg/kg) | Standard Deviation |
| --- | --- | --- |
| SS-C10-C | 93.79 | 8.80 |
| SS-F05-C | 900.98 | 77.26 |
| SS-H07-C | 161.43 | 2.87 |
| SS-H10-C | 26.48 | 1.94 |

Iron/Iron Pyrite in Aqueous Media

Aliquots containing 20 g of each sediment sample were each transferred to 100 ml serum bottles followed by 4 g of iron powder, 0.2 g of iron pyrite and 100 ml of deionized water. The contents of each bottle were thoroughly mixed and stirred continuously by placing the bottles on their sides on a horizontally moving mechanical shaker. Ten samples were prepared for each soil. Samples of each experiment were taken at zero time and other various time points. The samples were centrifuged at 2000 rpm for 40 minutes. The aqueous layers were decanted, and the residues stored in the cold for toxaphene extraction, diluted to a suitable concentration in hexane, and analyzed using the GC/ECD method. A four point calibration curve in which an authentic sample of commercially obtained toxaphene in a concentration range of 4–40 mg/L was used to calculate the results.

The results indicate a first order disappearance rate of toxaphene in the four soils. The half-life in days for each soil sample is as follows.

| | |
| --- | --- |
| SS-C10-C | 30.65995 |
| SS-F05-C | 30.84038 |
| SS-H07-C | 21.05678 |
| SS-H10-C | 16.54464 |

Iron/Iron Pyrite in Hydro-alcoholic Media

Aliquots containing 5 g of each sediment sample were each transferred to 100 ml serum bottles followed by 1 g of iron powder, 0.05 g of iron pyrite and 100 ml of a 30% solution of ethanol in deionized water. The contents of each bottle were thoroughly mixed and stirred continuously by placing the bottles on a horizontally moving mechanical shaker. Sampling and analysis were carried out as described above for iron/iron pyrite in aqueous media.

The results, shown in FIGS. 10–13 show the first order disappearance rate of toxaphene in the four soils in which 30% ethanol in water was used as the solvent medium. The half-life in days for each soil sample is as follows.

| | |
|---|---|
| SS-C10-C | 7.597056; |
| SS-F05-C | 11.00862; |
| SS-H07-C | 8.517455 |
| SS-H10-C | 5.780423 |

A comparison of the results of the iron/iron pyrite in aqueous media experiment with the iron/iron pyrite in hydro-alcoholic media experiment demonstrates that reduction of toxaphene is faster when the alcohol is included in the remediating mixture. It is believed that the greater solubility of toxaphene in 30% ethanol in water results in an increased availability of the toxaphene for the reduction process.

Modifications and variations of the remediating metal and sulfur-containing compositions and methods will be obvious to those skilled in the art from the foregoing detailed description. Such modifications and variations are intended to come within the scope of the appended claims.

We claim:

1. A method for the remediation of an environmental contaminant comprising reacting the contaminant with an alcohol, wherein the alcohol solubilizes the contaminants, and a reaction mixture comprising elemental iron and a sulfide-containing compound for a sufficient amount of time to cause chemical reduction of the contaminant, wherein the amount of the sulfide-containing compound is between 0.1% and 25% by weight of the mixture, and wherein the environmental contaminant is an organic compound.

2. The method of claim 1 wherein the iron is comminuted.

3. The method of claim 1 wherein the sulfide is a transition metal sulfide.

4. The method of claim 1 wherein the sulfide is selected from the group consisting of iron sulfide and sodium hydrogen sulfide.

5. The method of claim 1 wherein the sulfide-containing compound is iron sulfide.

6. The method of claim 1 wherein the iron is commercial grade iron.

7. The method of claim 1 wherein the contaminant is contaminating an environmental material selected from the group consisting of soil, sediment, aquifer material, water, and a container in which the contaminant was contained.

8. The method of claim 1 wherein the contaminant is selected from the group consisting of halogenated hydrocarbon compounds, halogenated hydrocarbon solvents, pesticides, chemical warfare agents and dyes.

9. The method of claim 1 wherein the contaminant is a soil or sediment contaminant.

* * * * *